United States Patent
Rajagopalan et al.

(10) Patent No.: US 6,181,742 B1
(45) Date of Patent: Jan. 30, 2001

(54) SINGLE PASS TARGET ALLOCATION FOR VIDEO ENCODING

(75) Inventors: Rajesh Rajagopalan, Bedminster, NJ (US); Thomas McCarthy, Cortlandt Manor; Cesar Gonzales, Katonah, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/013,148

(22) Filed: Jan. 26, 1998

(51) Int. Cl.$^7$ ....................................................... H04N 7/12
(52) U.S. Cl. ................... 375/240; 375/240.03; 358/133; 358/141; 358/427; 341/65; 341/51; 341/59
(58) Field of Search .................................... 348/404, 405, 348/409

(56) References Cited

U.S. PATENT DOCUMENTS 5,231,484 * 7/1993 Gonzales et al. .................... 358/133
5,680,129 * 10/1997 Weinberger et al. .................. 341/65
5,764,374 * 6/1998 Seroussi et al. ..................... 358/427

* cited by examiner

*Primary Examiner*—Chris S. Kelley
*Assistant Examiner*—Shawn S. An
(74) *Attorney, Agent, or Firm*—Daniel P. Morris

(57) ABSTRACT

Systems and methods are provided for allocating bits to pictures in accordance with the bit allocation constraints for operation at both constant and variable bit rates. A statistical complexity measure which is an estimate of the average encoding complexity of the entire data is updated after encoding each picture. This set of parameters, along with an estimate of the encoding complexity of the current picture and the desired average coding rate is used to allocate target bits for encoding the current picture. One method of allocating bits to a picture is to used the statistical complexity measure to vary the instantaneous rate of encoding and allocate bits for this picture so as to generate encoded data at this rate. Another method is to modulate the target generated by a conventional encoder using the current level of the Virtual Buffer Verifier and the deviation of the estimated encoding complexity of the current picture from the statistical complexity measures.

6 Claims, 9 Drawing Sheets

SINGLE PASS TARGET ALLOCATION FOR VIDEO ENCODING

BACKGROUND OF THE INVENTION

1. Field of the Invention

The present invention relates to the field of data compression and, more particularly, to systems and methods for compressing digital video signals.

2. Related Art

Technological advances in digital transmission networks, digital storage media, Very Large Scale Integration devices, and digital processing of video and audio signals are converging to make the transmission and storage of digital video economical in many applications. Because the storage and transmission of digital video signals are central to many applications, and because an uncompressed representation of a video signal typically requires a large amount of storage, the use of digital video compression techniques is important to this advancing art.

Several international standards for the compression of digital video signals have emerged over the past decade, with more currently under development. These standards apply to algorithms for the transmission and storage of compressed digital video in a variety of applications, including: video-telephony and teleconferencing; high-quality digital television transmission via coaxial networks, fiber-optic networks, terrestrial broadcast or direct satellite broadcast; and in interactive multimedia products stored on CD-ROM, Digital Tape, Digital Video Disk, and disk drives.

Several of the compression standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms were developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standards specify the syntax of the compressed bit stream and the method of decoding, but leave considerable latitude for novelty and variety in the algorithm employed in the encoder.

The MPEG-1 standard was developed for use in compressing progressive video. A progressive video sequence is a sequence in which each frame represents a scene as it is viewed at a discrete time instance. By contrast, for interlaced video, a field-every other line on the screen is captured periodically. For interlaced video, at alternating time instances the top and bottom field on a screen is refreshed. At any given time, data from two fields (a frame) can be seen.

The MPEG-2 standard, can be used to compress either interlaced video, progressive video, or a mixture of progressive and interlaced video: the encoder specifies whether each frame is progressive or interlaced.

The MPEG standards specify a bit stream in which the number of bits in the compressed representation of each picture is variable. This variation is due to the different types of picture processing, as well as the inherent variation with time of the spatio-temporal complexity of the scene being coded. This leads to the use of buffers to even out the fluctuations in bit rate. For a constant- bit-rate storage media or transmission channel, for example, buffering allows the bit rate of the compressed pictures to vary within limits that depend on the size of the buffers, while outputting a constant bit rate to the storage device or transmission channel.

Considering the importance of buffering, the MPEG standards define a hypothetical decoder called the Virtual Buffer Verifier (VBV), diagrammed in FIG. 1, that verifies whether an encoded bit stream is decodable with specified limitations on the decoder buffer size and the input bit rate. The VBV has two modes of operation: constant bit rate (CBR) and variable bit rate (VBR). The two modes are described below.

For constant-bit-rate operation, the Decoder Buffer 101 is filled at a constant bit rate with compressed data 100 from the storage or transmission medium. Both the buffer size and the bit rate are parameters that are transmitted in the compressed bit stream. After an initial delay, which is also derived from information in the bit stream, a hypothetical decoder 103 instantaneously removes from the buffer all of the data associated with the first picture. Thereafter, at intervals equal to the picture rate of the sequence, the decoder removes all data associated with the earliest picture in the buffer.

Variable-bit-rate operation is similar to the above, except that the compressed bit stream enters the buffer at a specified maximum bit rate until the buffer is full, at which point no more bits are input until the buffer at least partially empties. This translates to a bit rate entering the buffer that is effectively variable.

In order for the bit stream to satisfy the MPEG rate-control requirements, it is necessary that all the data for each picture be available within the buffer at the instant it is needed by the decoder. This requirement translates to upper and lower bounds ($U_k$ and $L_k$) on the number of bits allowed in each picture k. The upper and lower bounds for a given picture depend on the number of bits used in all the pictures preceding it. It is the function of the encoder to produce bit streams that satisfy the VBV requirements. It is not expected that actual decoders will necessarily be configured or operate in the manner described above. The hypothetical decoder and its associated buffer are simply a means of placing computable limits on the size of compressed pictures.

A rate control scheme can be found in U.S. Pat. No. 5,231,484 to Gonzales and Viscito, which describes a rate control mechanism that can be used for MPEG. A block diagram for this type of scheme is shown in FIG. 2. In this scheme, the input video signal Fk 200 is sent to a Complexity Estimator 201 and a Picture Coder 205. The Complexity Estimator sends a complexity estimate Ck (signal 202) to a Picture Bit Allocator 203. The Picture Bit Allocator allocates target bits per picture and computes a quantization scale Qk (signal 204) that is sent to the Picture Coder 205. The target bits per picture is set depending on the instantaneous buffer fullness of a hypothetical decoder buffer which will be receiving the compressed video signals from the encoder, the complexity of the immediately previously encoded pictures and the desired rate of encoding. The quantization scale is computed based on the target bits per picture and the complexity estimate. The Picture Coder uses the quantization scale to encode Fk and produce an output bit stream CDk (signal 206).

SUMMARY OF THE INVENTION

Because of the above, it is an object of the present invention to provide a system and techniques for allocating target bits to encode units of digital information such as pictures so that bit allocation constraints are met while maintaining consistently good quality (e.g. for pictures, visual quality) in the decoded information.

In accordance an aspect of the present invention, units of digital information (coding units) are allocated target bits for encoding based on the complexity estimate of the coding unit, accumulated statistics of the actual complexities of previously encoded coding units and the desired rate of encoding.

In various embodiments, methods are provided for allocating bits to pictures in accordance with the VBV constraints for operation at both constant and variable bit rates. In one embodiment the instantaneous rate of encoding is modified from the desired encoding rate by multiplying the desired rate with the ratio of the estimated coding complexity of this picture and the accumulated statistics of the encoding complexities of all the previously encoded pictures. Buffer constraints are then imposed to maintain VBV compliance.

In another embodiment, target bits are allocated to a picture so as to produce the desired rate. Then the target bits are modified from this value based on the VBV buffer levels and the deviation of the estimated coding complexity of the current picture from that of the accumulated statistics of the coding complexities of previously encoded pictures.

a. The MPEG-2 Environment

As the present invention may be applied in connection with an MPEG-2 encoder, in order to facilitate an understanding of the invention, some pertinent aspects of the MPEG-2 video compression standard will be reviewed. It is to be noted, however, that the invention can also be applied to other coding algorithms which share some features of the MPEG-2 standard.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings that have minimal length in some sense; and 3) the concatenation of the strings in a well-defined order. Steps 2 and 3 are lossless; i.e., the original data is faithfully recoverable upon reversal. Step 2 is known as entropy coding.

Step 1 can be either lossless or lossy. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 standard for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG video standards specify a coded representation of video for transmission. The standards are designed to operate on interlaced or noninterlaced component video. Each picture has three components: luminance (Y), red color difference (CR), and blue color difference (CB). For 4:2:0 data, the CR and CB components each have half as many samples as the Y component in both horizontal and vertical directions. For 4:2:2 data, the CR and CB components each have half as many samples as the Y component in the horizontal direction but the same number of samples in the vertical direction. For 4:4:4 data, the CR and CB components each have as many samples as the Y component in both horizontal and vertical directions.

An MPEG data stream consists of a video stream and an audio stream that are packed, with systems information and possibly other bit streams, into a systems data stream that can be regarded as layered. Within the video layer of the MPEG data stream, the compressed data is further layered. A description of the organization of the layers will aid in understanding the invention.

Figure 3:
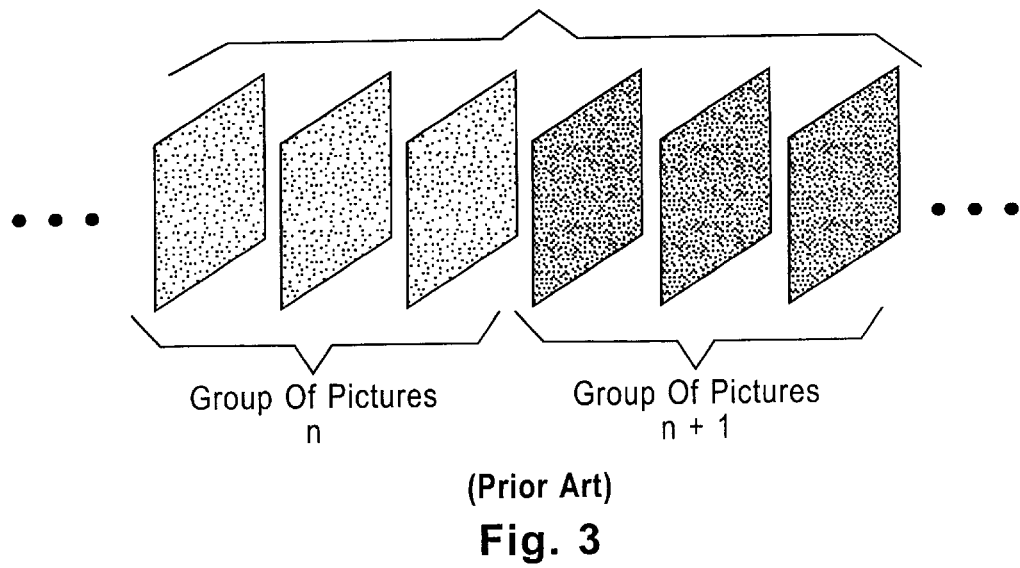
FIG. 3 shows an exemplary set of Group of Pictures (GOP's) layer of compressed data within the video compression layer of an MPEG data stream.

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 3. Decoding may begin at the start of any GOP, essentially independent of the preceding GOP's. There is no limit to the number of pictures that may be in a GOP, nor do there have to be equal numbers of pictures in all GOP's.

Figure 4:
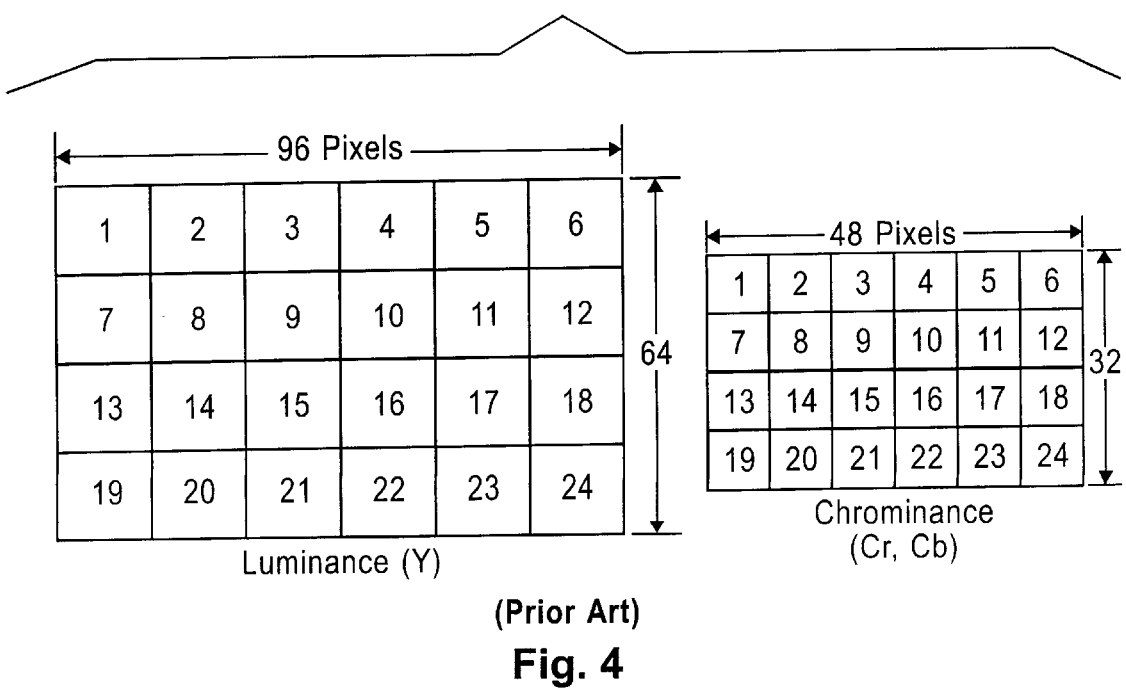
FIG. 4 shows an exemplary Macroblock (MB) subdivision of a picture in the MB layer of compressed data within the video compression layer of an MPEG data stream.

The third or "Picture" layer is a single picture. A general illustration of this layer is shown in FIG. 4. The luminance component of each picture is subdivided into 16×16 regions; the color difference components are subdivided into appropriately sized blocks spatially co-situated with the 16×16 luminance regions; for 4:4:4 video, the color difference components are 16×16, for 4:2:2 video, the color difference components are 8×16, and for 4:2:0 video, the color difference components are 8×8. Taken together, these co-situated luminance region and color difference regions make up the fifth layer, known as "macroblock" (MB). Macroblocks in a picture are numbered consecutively in raster scan order.

Between the Picture and MB layers is the fourth or "Slice" layer. Each slice consists of some number of consecutive MB's. Slices need not be uniform in size within a picture or from picture to picture.

Figure 5:
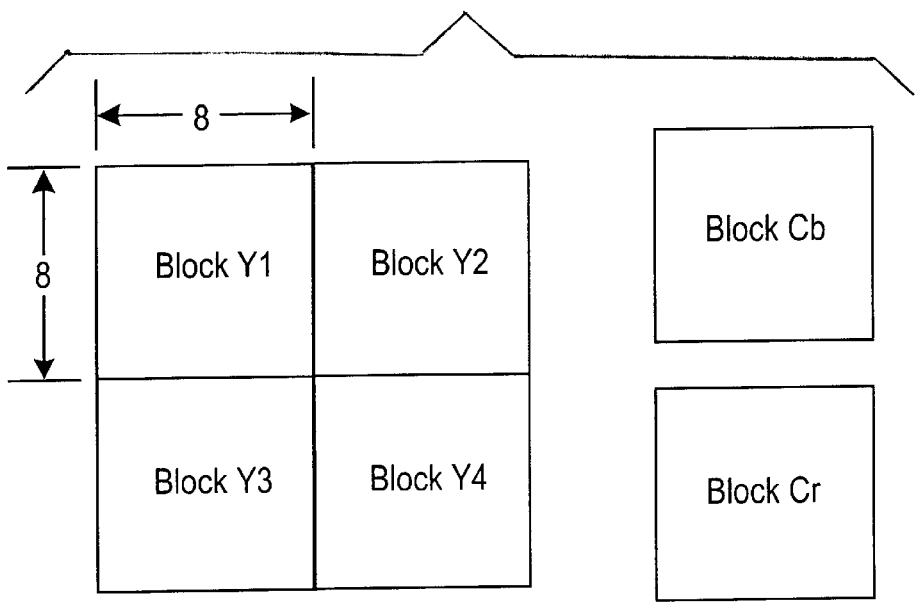
FIG. 5 shows the Block subdivision of a Macroblock.

Finally, as shown in FIG. 5, each MB consists of four 8×8 luminance blocks and 8, 4, or 2 (for 4:4:4, 4:2:2 and 4:2:0 video) chrominance blocks. If the width of the luminance component in picture elements or pixels of each picture is denoted as C and the height as R (C is for columns, R is for rows), a picture is C/16 MB's wide and R/16 MB's high.

The Sequence, GOP, Picture, and Slice layers all have headers associated with them. The headers begin with byte-aligned "Start Codes" and contain information pertinent to the data contained in the corresponding layer.

A picture can be either field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a frame-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of two fields.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2.

Figure 6:
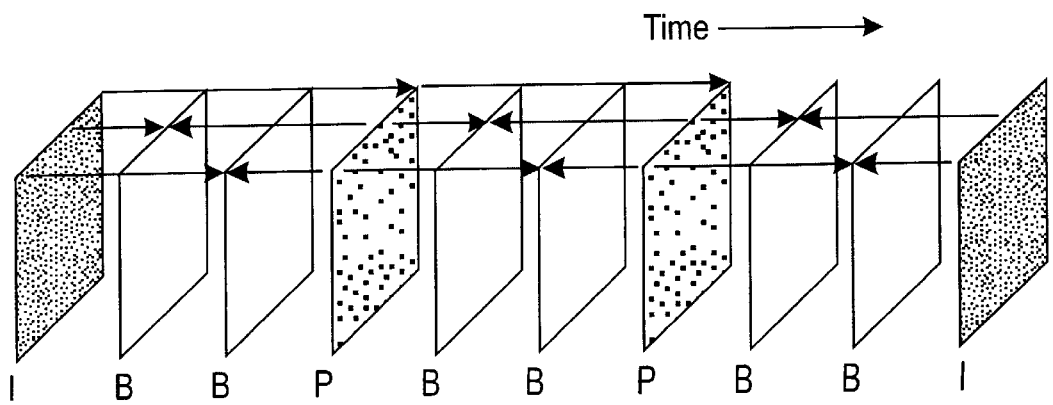
FIG. 6 shows the type of Pictures in a typical Group of Pictures.

Within a GOP, three "types" of pictures can appear. An example of the three types of pictures within a GOP is shown in FIG. 6. The distinguishing feature among the picture types is the compression method used. The first type, Intramode pictures or I pictures, are compressed independently of any other picture. Although there is no fixed upper bound on the distance between I pictures, it is expected that they will be interspersed frequently throughout a sequence to facilitate random access and other special modes of operation. Predictively motion-compensated pictures (P pictures) are reconstructed from the compressed data in that picture and two most recently reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P -pictures that will be displayed in the future. Because reconstructed I or P pictures can be used to reconstruct other pictures, they are called reference pictures.

One very useful image compression technique is transform coding. In MPEG and several other compression standards, the discrete cosine transform (DCT) is the transform of choice. The compression of an I picture is achieved by the steps of 1) taking the DCT of blocks of pixels, 2) quantizing the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantization of the DCT coefficients, is the primary source of loss in the MPEG standards. Denoting the elements of the two-dimensional array of DCT coefficients by cmn, where m and n can range from 0 to 7, aside from truncation or rounding corrections, quantization is achieved by dividing each DCT coefficient cmn by wmn X QP, with wmn being a weighting factor and QP being the macroblock quantizer. Note that QP is applied to each DCT coefficient. The weighting factor wmn allows coarser quantization to be applied to the less visually significant coefficients.

There can be several sets of these weights. For example, there can be one weighting factor for I pictures and another for P and B pictures. Custom weights may be transmitted in the video sequence layer, or default values may be used. The macroblock quantizer parameter is the primary means of trading off quality vs. bit rate in MPEG-2. It is important to note that QP can vary from MB to MB within a picture. This feature, known as adaptive quantization (AQ), permits different regions of each picture to be quantized with different step-sizes, and can be used to equalize (and optimize) the visual quality over each picture and from picture to picture. Typically, for example in MPEG test models, the macroblock quantizer is computed as a product of the macroblock masking factor and the picture nominal quantizer (PNQ).

Following quantization, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy before coding a picture is motion compensation. MPEG-2 provides several tools for motion compensation (described below).

All the methods of motion compensation have the following in common. For each macroblock, one or more motion vectors are encoded in the bit stream. These motion vectors allow the decoder to reconstruct a macroblock, called the predictive macroblock. The encoder subtracts the predictive macroblock from the macroblock to be encoded to form the difference macroblock. The encoder uses tools to compress the difference macroblock that are essentially similar to the tools used to compress an intra macroblock.

The type of picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used.

Figure 1:
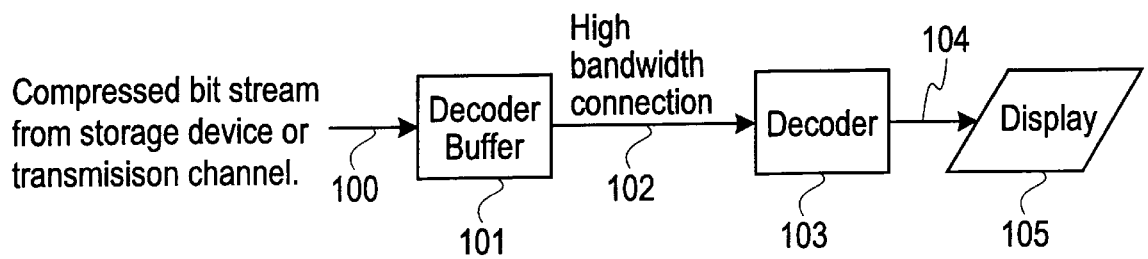
FIG. 1 is a block diagram of a Virtual Buffer Verifier.

The MPEG standards can be used with both constant-bit-rate and variable-bit-rate transmission and storage media. The number of bits in each picture will be variable, due to the different types of picture processing, as well as the inherent variation with time of the spatio-temporal complexity of the scene being coded. The MPEG standards use a buffer-based rate control strategy, in the form of a Virtual Buffer Verifier (VBV), to put meaningful bounds on the variation allowed in the bit rate. As depicted in FIG. 1, the VBV is devised as a decoder buffer 101 followed by a hypothetical decoder 103, whose sole task is to place bounds on the number of bits used to code each picture so that the overall bit rate equals the target allocation and the short-term deviation from the target is bounded. The VBV can operate in either constant-bit-rate or variable-bit-rate mode.

In constant-bit-rate mode, the buffer is filled at a constant bit rate with compressed data in a bit stream from the storage or transmission medium. Both the buffer size and the bit rate are parameters that are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 7:
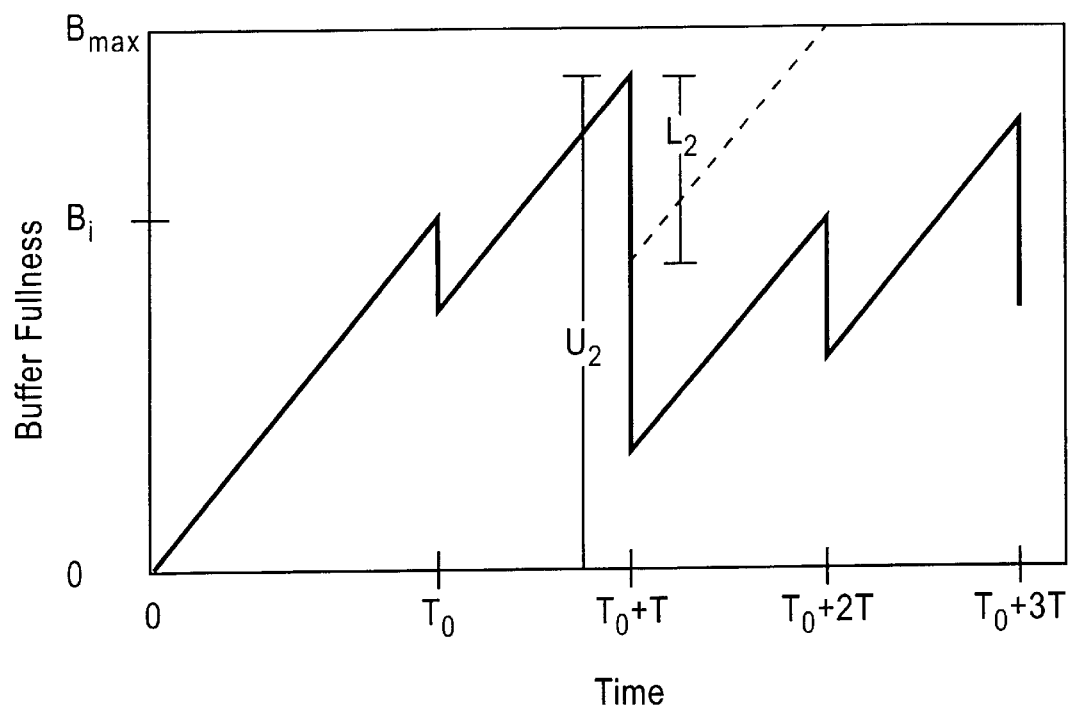
FIG. 7 shows an exemplary plot of the evolution of a virtual decoder buffer over time for operation in constant-bit-rate mode.

The operation of the VBV is shown by example in FIG. 7. The figure depicts the fullness of the decoder buffer over time. The buffer starts with an initial buffer fullness of Bi after an initial delay of time T0. The sloped line segments show the compressed data entering the buffer at a constant bit rate. The vertical line segments show the instantaneous removal from the buffer of the data associated with the earliest picture in the buffer. In this example, the pictures are shown to be removed at a constant interval of time T. In general, the picture display interval, i.e., the time interval between the removal of consecutive pictures, may be variable.

For the bit stream to satisfy the MPEG rate control requirements, it is necessary that all the data for each picture be available within the buffer at the instant it is needed by the decoder and that the decoder buffer does not overfill. These requirements translate to upper ($U_k$) and lower ($L_k$) bounds on the number of bits allowed in each picture (k). The upper and lower bounds for a given picture depend on the number of bits used in all the pictures preceding it. For example, the second picture may not contain more than $U_2$ bits since that is the number of bits available in the buffer when the second picture is to be removed, nor less than $L_2$ bits since removing less than $L_2$ bits would result in the buffer overflowing with incoming bits. It is a function of the encoder to produce bit streams that can be decoded by the VBV without error.

For constant-bit-rate operation, the buffer fullness just before removing a picture from the buffer is equal to the buffer fullness just before removing the previous picture minus the number of bits in the previous picture plus the product of the bit rate and the amount of time between removing the picture and the previous picture; i.e., buffer fullness before remove pic=buffer fullness before remove last pic−bits in last pic+time between pic and last pic×bit rate The upper bound for the number of bits in a picture is equal to the buffer fullness just before removing that picture from the buffer. The lower bound is the greater of zero bits or the buffer size minus the buffer fullness just before removing that picture from the buffer plus the number of bits that will enter the buffer before the next picture is removed. The buffer fullness before removing a given picture depends on the initial buffer fullness and the number of bits in all of the preceding pictures, and can be calculated by using the above rules.

Figure 8:
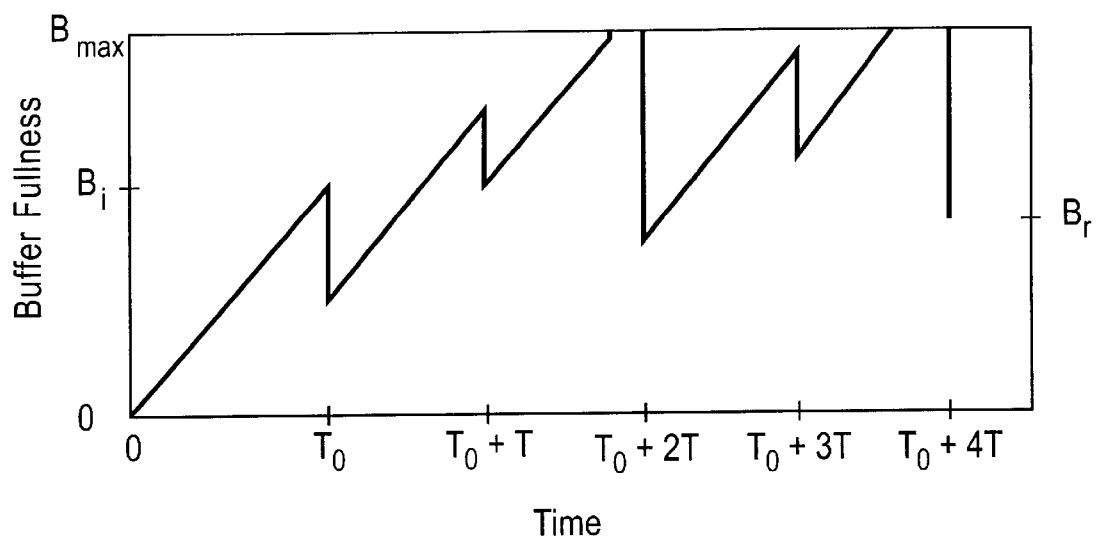
FIG. 8 shows an exemplary plot of the evolution of a virtual decoder buffer over time for operation in variable-bit-rate mode.

Variable-bit-rate operation is similar to the above, except that the compressed bit stream enters the buffer at a specified maximum bit rate until the buffer is full, when no more bits are input. This translates to a bit rate entering the buffer that may be effectively variable, up to the maximum specified rate. An example plot of the buffer fullness under variable-bit-rate operation is shown in FIG. 8. The buffer operates similarly to the constant-bit-rate case except that the buffer fullness, by definition, cannot exceed the buffer size of Bmax. This leads to an upper bound on the number of bits produced for each picture, but no lower bound.

For variable bit rate operation, the buffer fullness just before removing a picture from the buffer is equal to the size of the buffer or to the buffer fullness just before removing the previous picture minus the number of bits in the previous picture plus the maximum bit rate times the amount of time between removing the picture and the previous picture, whichever is smaller; i.e., buffer fullness before remove pic=min(buffer fullness before remove last pic−bits in last pic+time between pic and last pic× bit rate, buffer size)

The upper bound for the number of bits in a picture is again equal to the buffer fullness just before removing that picture from the buffer. As mentioned earlier, the lower bound is zero. The buffer fullness before removing a given picture again depends on the initial buffer fullness and the number of bits in all of the preceding pictures, and can be calculated by using the above rules.

b. Preferred Embodiment of an Encoder

In accordance with an embodiment of the present invention, target allocation is based not only on the current state of the buffer and the estimated coding complexity of a picture, but also on statistics of the coding complexities of all the previously encoded pictures. The statistics in conjunction with the estimated coding complexity of the current picture are used to vary the instantaneous rate of encoding and allocate target bits for encoding the current picture. The current buffer level is used to bound the target so as to not to underflow or overflow the VBV buffer. Specifically, the current buffer level is used to compute the upper and lower bounds ($U_k$ and $L_k$) for the current picture k as outlined in the previous section and the target is made to lie within these bounds, $L_k \leq T_k \leq U_k$.

Figure 9:
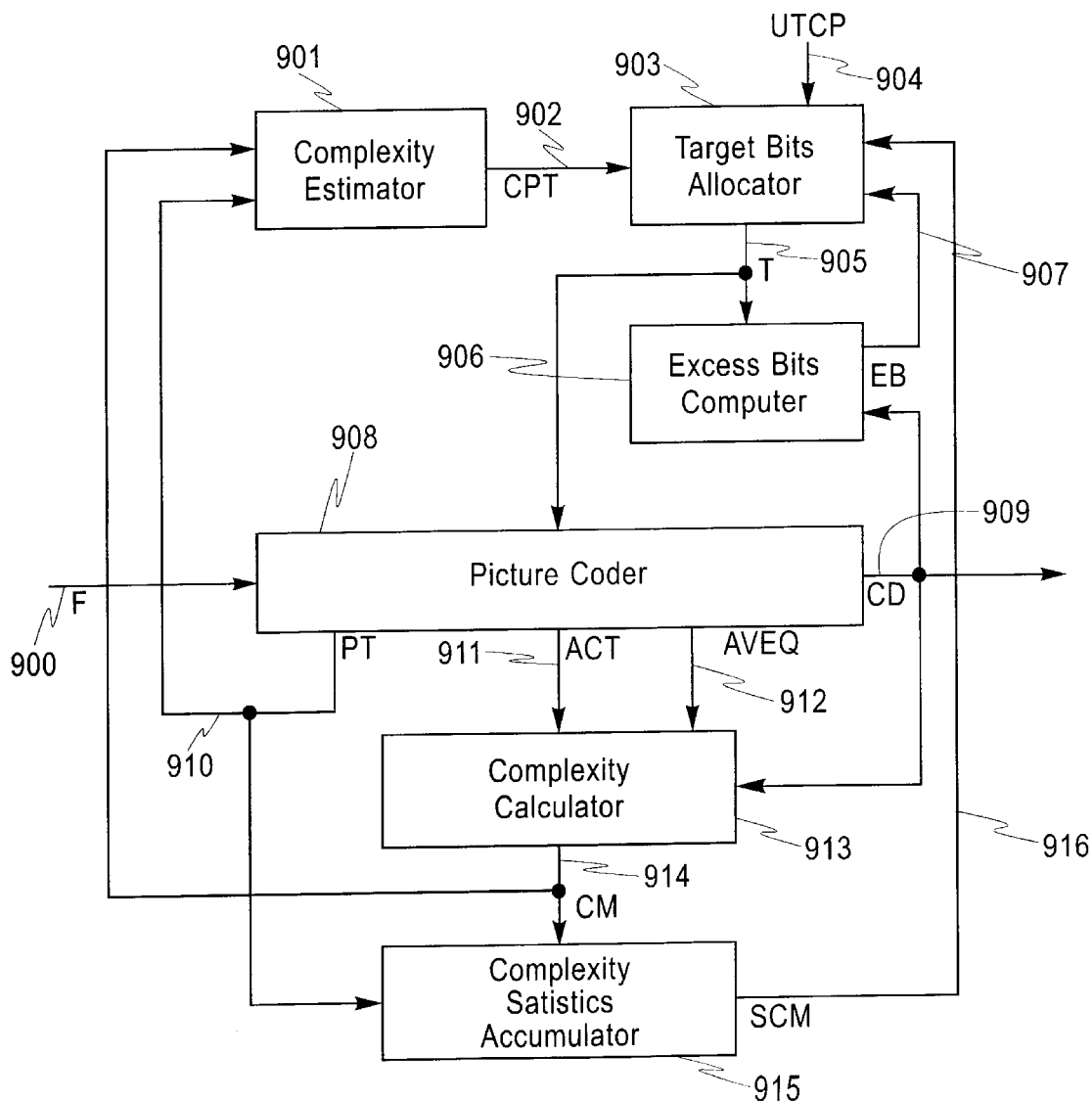
FIG. 9 is an overview of a video compression system according to an embodiment of the present invention.

FIG. 9 shows the components of an embodiment of the present invention and their interconnection. The Picture Coder 908 is of a conventional type, similar to the Picture Coder 205 of FIG. 2. The input video signal 900, F, is input to the Picture Coder which classifies this picture as one the three types I, P or B described previously. This information is sent out of the Picture Coder as Picture Type PT (signal 910). The Complexity Estimator 901 reads the Picture Type signal and the computed encoding complexity of previously encoded picture CM and estimates the encoding complexity (C) of the current picture. The CE sends the estimated encoding complexity (C) and the Picture Type (PT) to the Target Bits Allocator TBA (903) as signal 902 (CPT). The Complexity Statistics Accumulator 915 (CSM) also sends the parameters Statistical Complexity Measures (SCM) (signal 916) to the TBA. In addition, a set of parameters Unit Time Coding Parameters UTCP (signal 904) are input to the TBA. The UTCP specifies the average rate of coding $R_{UT}$ and the number of pictures of type I, P and B occurring per unit time. Unit time could be one second or half a second. The UTCP could either be fixed at the beginning of encoding or vary as encoding progresses. In the preferred embodiment, unit time is a second and the UTCP is fixed at the beginning of encoding. The TBA produces the target number of bits T (signal 905) for encoding a picture and sends this parameter to the Picture Coder (PC) and to the Excess Bits Computer 906 (EBC). The EBC cumulatively updates the mismatch between the target bits allocated and the actual bits produced by the Picture Coder after encoding a picture and sends this parameter EB (signal 907) to the Target Bit Allocator which uses it for allocating target bits for the next picture. The Picture Coder encodes the input video signal 900 using the Target Bits 905. The Picture Coder produces the Encoded Bits CD (signal 909), the Activity ACT (signal 911) and the Average Quantization AVEQ (signal 912) of a picture after encoding the picture. ACT is the spatial activity of a picture and AVEQ is the average value of the quantizations used for encoding the macroblocks of the picture. The Complexity Calculator 913 (CC) uses CD, AVEQ and ACT to calculate the Encoding Complexity CM (signal 914) of the current picture. The CSM uses CM and PT to update the Statistical Complexity Measures SCM.

Each of the components of FIG. 9 can be embodied in hardware or as software instantiated in the memory of a general purpose computer. Preferably, all of the components—the Picture Coder, Complexity Estimator, Target Bits Allocator, Excess Bits Computer, Complexity Calculator and Complexity Statistics Accumulator will be embodied as a hardware component or circuit board with associated microcode control. The preferred embodiments of each of the above components will now be described.

The Complexity Estimator 901 estimates the encoding complexity of the current picture k as the computed complexity of the previous picture of the same type, i.e., $C_k = CM_{ppst}$ where ppst indicates the previous encoded picture of the same type and k denotes the time index. $PT_k$ is used to determine the type of the current picture. For example, if pictures k-5, k-4, k-3, k-2, k-1, k, k+1 are of types P, B, B, P, B, B, I respectively, then $C_k = CM_{k-1}$, $C_{k-1} = CM_{k-3}$ and $C_{k-2} = CM_{k-5}$.

The Excess Bits Computer 906 accumulates the mismatch between the Target Bits $T_k$ and the Encoded Bits $CD_k$ for picture k to produce the Excess Bits $EB_k$ after encoding picture k as: $EB_k = EB_{k-1} + T_k - CD_k$.

The Complexity Calculator 913 calculates the complexity of each picture after it is encoded as:

$$CM_k = \frac{AVEQ_k \times CD_k}{ACT_k}$$

The Activity $ACT_k$ could be the spatial or the spatio-temporal activity of an encoded picture. In the preferred embodiment, $ACT_k$ is the spatial activity computed as the variance of the pixel values of the picture. Since the variance is a well known parameter in the art, it will not be further described.

Figure 2:
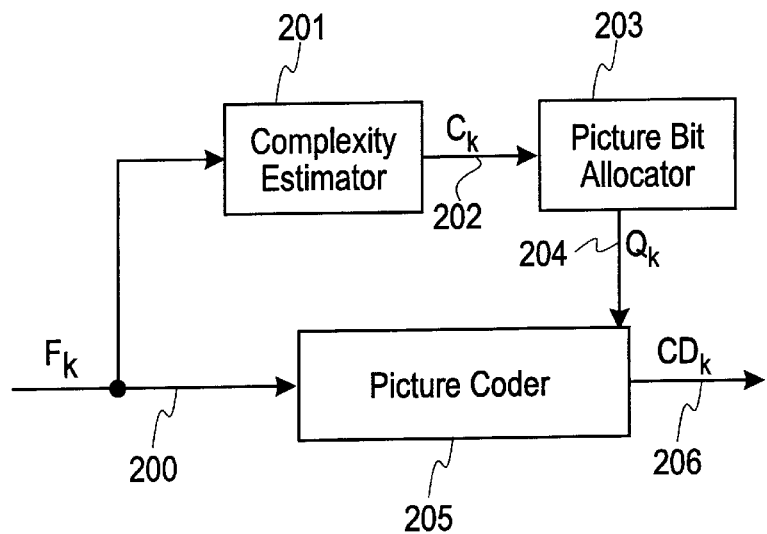
FIG. 2 is an overview of a conventional video compression system.

The Picture Coder 908 is of the type in FIG. 2 which processes the input video signal $F_k$ and based on the Target Bits $T_k$ computes a nominal value of quantization to be used for the picture. It classifies the picture k as one of three types I,P or B and based on the classification performs motion compensation followed by discrete cosine transform, quantization and lossless coding. These steps have been explained in brief earlier and are well known in the art and will not be further described. In the preferred embodiment, the Picture Coder used is the one as described in a previously issued patent to Gonzales et. al., Pat. No. 5,231,484.

Figure 10:
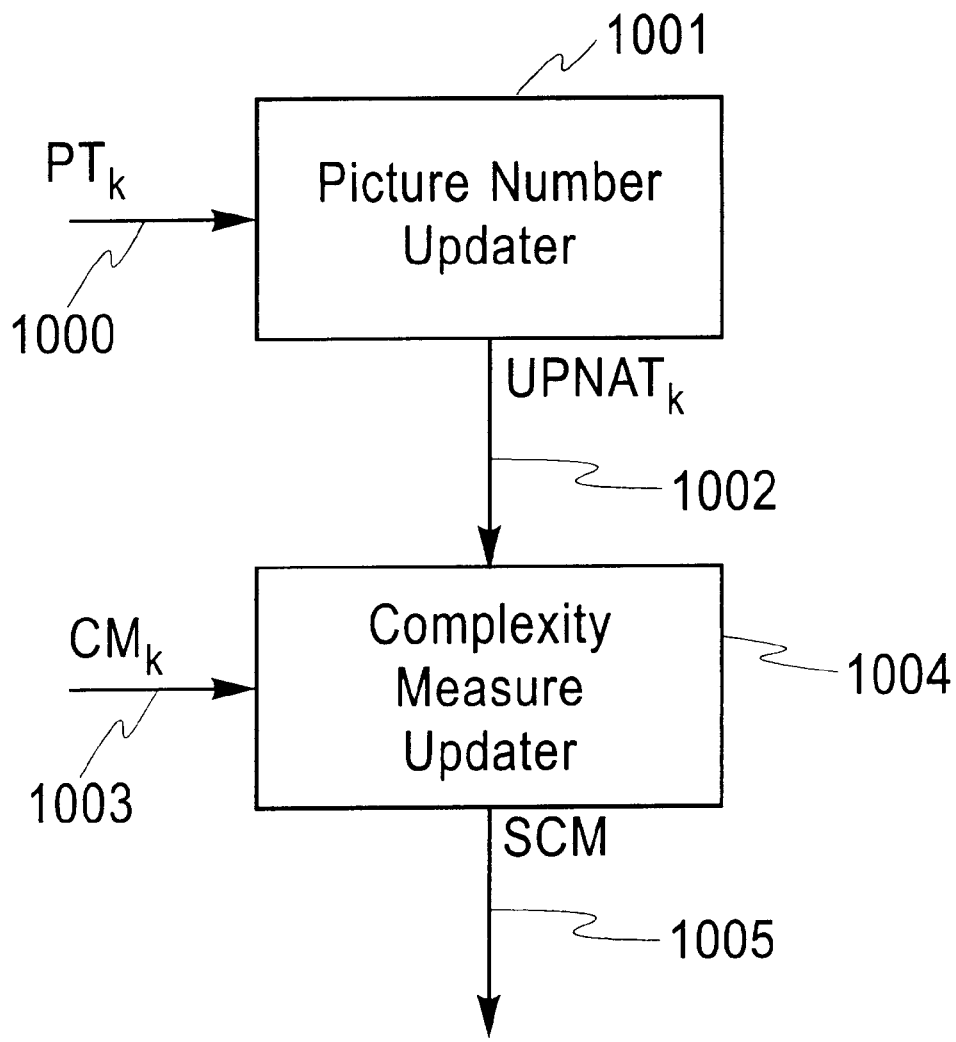
FIG. 10 shows the Complexity Statistics Accumulator in the preferred embodiment of the current invention.

There are six parameters stored in the Complexity Statistics Accumulator 915 (CSA). The parameters are the Statistical Complexity Measure for each picture type $SCM_I$, $SCM_P$, $SCM_B$ and the number of pictures of each type $N_I$, $N_P$ and $N_B$ encoded so far. FIG. 10 shows the CSA in greater detail. The Picture Number Updater 1001 (PNU) reads the Picture Type $PT_k$ (signal 1000) and updates the number of pictures encoded so far of that particular type of picture. For example, in the previous example illustration, since picture k is of type B, the Picture Coder makes the $PT_k$ signal denote a B picture. The PNU reads this signal and updates the number of B pictures encoded to be $$N_B = N_B + 1$$

The PNU then sends the Updated Picture Number And Type UPNAT (signal 1002) to the Complexity Measure Updater 1004 (CMU). The CMU also reads in the computed complexity $CM_k$ (signal 1003) of picture k and updates one of the three Statistical Complexity Measures as determined by the UPNAT signal. In the previous example, since picture k is a type B picture, $SCM_B$ is updated while $SCM_I$, $SCM_P$ are left unchanged. The update is $$SCM_B = \frac{(N_B - 1) \times SCM_B + CM_k}{N_B}$$

If picture k were a type I or P picture, the above update equation is suitably modified using $SCM_I$, $N_I$ or $SCM_P$, $N_P$ respectively. The CMU then sends the updated Statistical Complexity Measures SCM (signal 1005) to the TBA. The SCM consists of the Statistical Complexity Measure of the three types of pictures, i.e., $$SCM = \{SCM_I, SCM_P, SCM_B\}$$

Figure 11:
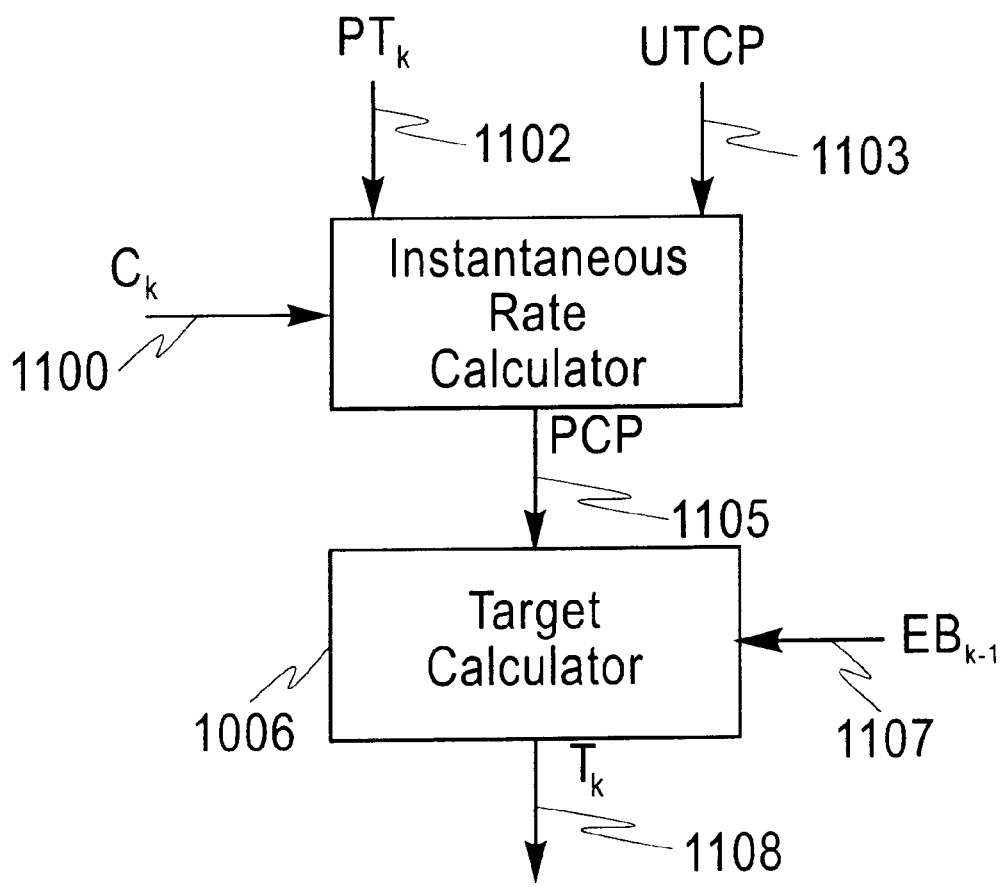
FIG. 11 shows the Target Bits Allocator in the preferred embodiment of the current invention.

Signals SCM, $C_k$, $EB_{k-1}$, UTCP and $PT_k$ are input to the TBA which allocates a target number of bits for encoding picture k. FIG. 11 shows the TBA in greater detail. The TBA consists of two components: the Instantaneous Rate Calculator 1101 (IRC) and the Target Calculator 1106 (TC). The estimated coding complexities of the three types of pictures $C_I$, $C_P$ and $C_B$ are stored in the IRC. The estimated complexity of the current picture $C_k$ (signal 1100) in conjunction with the Picture Type signal $P_k$ (signal 1102) is used to update the estimated complexity for the picture of the appropriate type (Step 1 below). The IRC also receives the UTCP (signal 1103) and the SCM (signal 1104). The IRC calculates the instantaneous rate in the following sequence of steps:

Step 1: If $PT_k$ denotes picture type I, $C_I = C_k$ else if $PT_k$ denotes picture type P $C_P = C_k$ else $C_B = C_k$.

Step 2: From the Unit Time Coding Parameters (UTCP) signal 1103 extract the number of pictures of each type per unit time $N_{IUT}$, $N_{PUT}$, $N_{BUT}$ and the desired average coding rate per unit time $R_{UT}$.

Step 3: From the SCM signal 1104 extract the parameters $SCM_I$, $SCM_P$, $SCM_B$ which denote the Statistical Complexity Measures of picture types I, P and B.

Step 4: Calculate the instantaneous coding rate $R_I$ as $$R_I = \frac{N_{IUT} \times C_I + N_{PUT} \times C_P + N_{BUT} \times C_B}{N_{IUT} \times SCM_I + N_{PUT} \times SCM_P + N_{BUT} \times SCM_B} \times R_{UT}$$

The IRC sends the Picture Coding Parameters PCP (signal 1105) to the Target Calculator 1106. The Target Calculator extracts the instantaneous coding rate $R_I$, the number of pictures of each type per unit time ($N_{IUT}$, $N_{PUT}$, $N_{BUT}$), the estimated coding complexity of each type of picture ($C_I$, $C_P$, $C_B$) and the Picture Type $PT_k$ signal from the PCP. The Excess Bits $EB_{k-1}$ (signal 1107) is also fed into the Target Calculator. This unit then calculates the target as:

$$T_k = \frac{R_I + EB_{k-1}}{N_{IUT} \times C_I + N_{PUT} \times C_P + N_{BUT} \times C_B} \times C_k$$

where $C_k = C_I$ if $PT_k$ denotes an I picture, $C_k = C_P$ if $PT_k$ denotes a P picture else $C_k = C_B$. The Target Calculator also computes the upper ($U_k$) and lower ($L_k$) bounds on the target before an underflow or overflow can occur and limits the target to lie within these bounds:

If $T_k \geq U_k$ then $T_k = U_k$

If $T_k \leq L_k$ then $T_k = L_k$

The computation of $U_k$, $L_k$ is carried on as outlined earlier. The computed Target Bits $T_k$ (signal 1108) is sent to the Picture Coder.

Conceptually, the task of the Complexity Statistics Accumulator is to estimate the average encoding complexity of the entire video sequence based on using all of the past encoded information. The first component of the TBA, namely the IRC, uses this estimate to modulate the rate of encoding at that instant to be either greater than, lesser than or equal to the average rate of encoding $R_{UT}$. The strength of modulation and whether the instantaneous rate of encoding is greater, less or equal to the average rate is dependent on the ratio of the estimated complexities to the estimated average of the complexities (or the Statistical Complexity Measure.) The estimated complexities will be greater than the SCM if the most recent pictures encoded are more complex than the average. In this situation, the instantaneous rate will be greater than the average rate. Similarly, if the most recently coded pictures are less complex than the SCM, the instantaneous rate will be smaller than the average. In this manner, quality of encoding is maintained with less complex pictures being allocated less bits while more complex picture being allocated more bits for encoding. The Statistical Complexity Measure is used to determine if a picture is less complex or more complex. Those skilled in the art will recognize that other statistical measures (for example the median of complexities of all previously encoded picture of a certain type) could well be used in place of the equation used by the Complexity Measure Updater.

c. Another Embodiment of an Encoder

In a second embodiment, all the components in FIG. 9 remain the same except the Complexity Statistics Accumulator and the Target Bits Allocator. The CSA in this case updates the Statistical Complexity Measure as follows:

If $PT_k$ indicates picture of type I, then $$SCM_I = \frac{SCM_I \times (M_I - 1) + CM_k}{M_I}$$

Else if $PT_k$ indicates picture of type P, then $$SCM_P = \frac{SCM_P \times (M_P - 1) + CM_k}{M_P}$$

Else $$SCM_B = \frac{SCM_B \times (M_B - 1) + CM_k}{M_B}$$

where $M_I$, $M_P$, $M_B$ are some fixed numbers. In the preferred embodiment, $M_I = M_P = M_B = 1024$.

Figure 12:
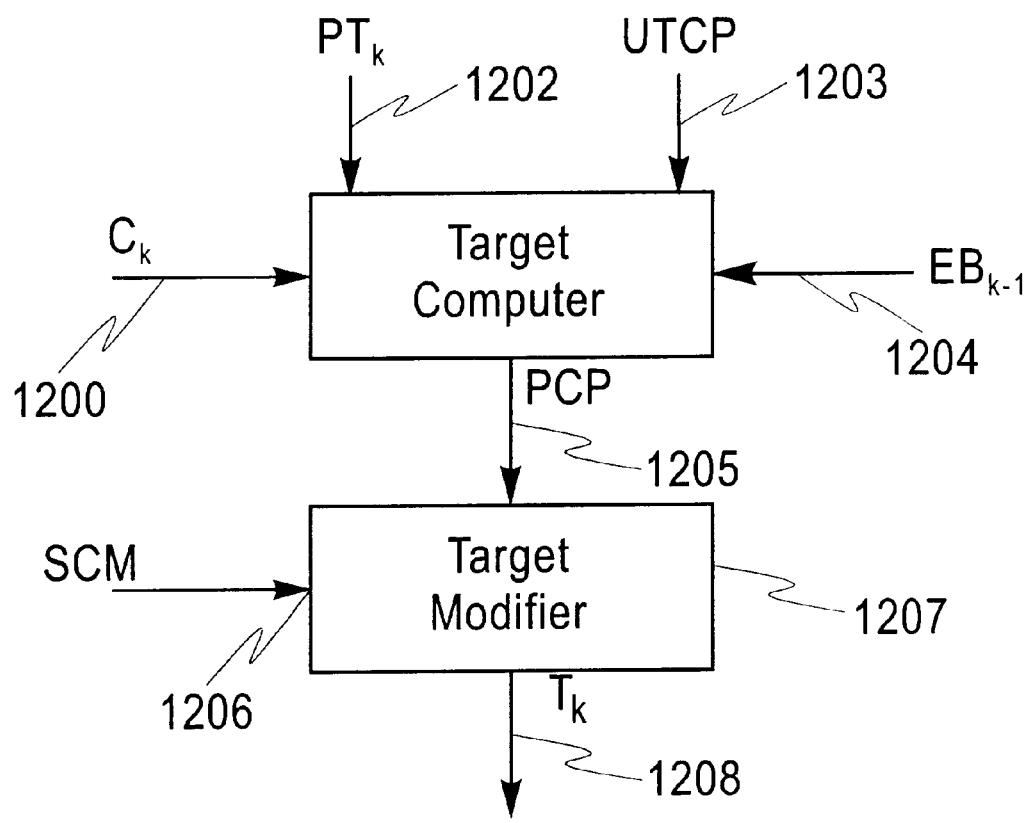
FIG. 12 shows the Complexity Statistics Accumulator in the second embodiment of the current invention.

The TBA has as inputs signals SCM, $C_k$, $EB_{k-1}$, UTCP and $PT_k$. FIG. 12 shows the TBA in greater detail. The TBA consists of two components: the Target Computer 1201 (TC) and the Target Modifier 1207 (TM). The estimated coding complexities of the three types of pictures $C_I$, $C_P$ and $C_B$ are stored in the TC. The estimated complexity of the current picture $C_k$ (signal 1200) in conjunction with the Picture Type signal $P_k$ (signal 1202) is used to update the estimated complexity for the picture of the appropriate type (Step 1 below). The TC also receives the UTCP (signal 1203) and the $EB_{k-1}$ (signal 1204). The TC computes a intermediate target for picture k as follows:

Step 1: If $PT_k$ denotes picture type I, $C_I = C_k$ else if $PT_k$ denotes picture type P $C_P = C_k$ else $C_B = C_k$.

Step 2: From the Unit Time Coding Parameters (UTCP) signal 1203 extract the number of pictures of each type $N_{IUT}$, $N_{PUT}$, $N_{BUT}$ per unit time and the desired average coding rate per unit time $R_{UT}$.

Step 3: Calculate the intermediate target $T_{inter}$ as $$T_{inter} = \frac{R_{UT} + EB_{k-1}}{N_{IUT} \times C_I + N_{PUT} \times C_P + N_{BUT} \times C_B} \times C_k$$

where $C_k = C_I$ if $PT_k$ denotes an I picture, $C_k = C_P$ is $PT_k$ denotes a P picture else $C_k = C_B$. The Target Computer also computes the upper ($U_k$) and lower ($L_k$) bounds on the target before an underflow or overflow can occur. The $T_{inter}$, $U_k$, $L_k$, $PT_k$ are input to the Target Modifier as TP (signal 1205). The other inputs to the TM are the Statistical Complexity Measures. The Target Modifier computes the final target $T_k$ for picture k in the following way:

Step 1: Does $PT_k$ denote a picture of type I? If no, go to Step 2. If yes:

If $C_I \geq SCM_I$, $$T_k = T_{inter} + \frac{C_I - SCM_I}{C_I + SCM_I} \times (U_k - T_{inter}) \times \alpha$$

else $$T_k = T_{inter} + \frac{C_I - SCM_I}{C_I + SCM_I} \times (T_{inter} - L_k) \times \alpha$$

Go to Step 4.

Step 2: Does $PT_k$ denote a picture of type P? If no, go to Step 3. If yes:

If $C_P \geq SCM_P$, $$T_k = T_{inter} + \frac{C_P - SCM_P}{C_P + SCM_P} \times (U_k - T_{inter}) \times \alpha$$

else $$T_k = T_{inter} + \frac{C_P - SCM_P}{C_P + SCM_P} \times (T_{inter} - L_k) \times \alpha$$

Go to Step 4.

Step 3: If $C_B \geq SCM_B$, $$T_k = T_{inter} + \frac{C_B - SCM_B}{C_B + SCM_B} \times (U_k - T_{inter}) \times \alpha$$

else $$T_k = T_{inter} + \frac{C_B - SCM_B}{C_B + SCM_B} \times (T_{inter} - L_k) \times \alpha$$

Step 4:

If $T_k \geq U_k$ then $T_k = U_k$

If $T_k \leq L_k$ then $T_k = L_k$

The computed Target Bits $T_k$ (signal 1108) is sent to the Picture Coder (please refer to FIG. 9). In the above steps $\alpha$ is a scaling parameter which is a number greater than zero. In this embodiment of the encoder, $\alpha = 0.33$.

Conceptually, the above method of allocating targets amounts to first determining target bits (intermediate target) so as to generate on the average $R_{UT}$ bits. Then based on the VBV buffer level, the target is allocated as either greater than, less than or equal to the intermediate target depending on whether the estimated complexity of the current picture is greater than, less than or equal to the Statistical Complexity Measure of the picture of the same type. Again, as in the preferred embodiment, the goal is to allocate more bits to more complex pictures and less bits to less complex pictures as indicated by the estimated complexity and the estimated average coding complexity (or the Statistical Complexity Measure). Thus, we seek to maintain the encoding quality of all pictures by allocating more or less bits as indicated by the above description. The Statistical Complexity Measure computed in the second embodiment is different from that in the preferred embodiment in that all previously encoded pictures do not have the same contribution to the SCM. Unlike in the preferred embodiment, recently encoded pictures have greater contribution to the SCM than encoded pictures more in the past. In this way, the SCM is affected to a greater degree by the spatio-temporal variations in the video sequence of different pictures.

While the invention has been described for MPEG encoding, it can be used with other video coding techniques or even with non-video data. Indeed, any digital information can be segmented into coding units, and bits allocated to the coding units (for fixed rate or variable rate encoding). The coding units can then be encoded based on the allocation. The techniques described for bit allocation will work whether or not the data is video. For example, digitized speech can be segmented into one millisecond frames (these audio frames would play the same role as the video pictures) and bits can be allocated for each millisecond of audio (the coding units).

Now that the invention has been described by way of the preferred embodiment, various modifications and improvements will occur to those skilled in the art. Thus, it should be understood that the preferred embodiment has been provided as an example and not as a limitation. The scope of the invention is defined by the appended claims.

We claim:

1. A method comprising:
a method for encoding of ordered coding units comprising the steps of:
modeling the encoding complexity of previously encoded coding units based on the data generated after encoding said units;
accumulating statistics of the encoding complexities of all previously encoded coding units;
estimating the encoding complexity of the next coding unit to be encoded;
assigning a number of bits to the next coding unit to be encoded based on a function of the accumulated statistics, the estimated encoding complexity, the number of coding units per unit time interval and the desired average rate per unit time interval;
the data is video data;
the coding units are pictures;
the method for encoding applied to MPEG video encoding wherein said steps of accumulating statistics is done by computing the running means using the equations:

$$SCM_I = \frac{(N_I - 1) \times SCM_I + CM_k}{N_I}$$

$$SCM_P = \frac{(N_P - 1) \times SCM_P + CM_k}{N_P}$$

$$SCM_B = \frac{(N_B - 1) \times SCM_B + CM_k}{N_B}$$

wherein $N_I$, $N_P$, $N_B$ are the number of pictures of each type encoded thus far, $CM_k$ is the encoding complexity of picture with time index k and $SCM_I$, $SCM_P$, $SCM_B$ are the accumulated statistics of the encoding complexities of pictures of types I, P, B respectively.

2. A method of comprising:
a method for encoding of ordered coding units comprising the steps of:
modeling the encoding complexity of previously encoded coding units based on the data generated after encoding said units;
accumulating statistics of the encoding complexities of all previously encoded coding units;
estimating the encoding complexity of the next coding unit to be encoded;
assigning a number of bits to the next coding unit to be encoded based on a function of the accumulated statistics, the estimated encoding complexity, the number of coding units per unit time interval and the desired average rate per unit time interval;
the data is video data;
the coding units are pictures;
the method for encoding applied to MPEG video encoding wherein said steps of accumulating statistics is done by computing the filtered running means using the equations:

$$SCM_I = \frac{(M_I - 1) \times SCM_I + CM_k}{M_I}$$

$$SCM_P = \frac{(M_P - 1) \times SCM_P + CM_k}{M_P}$$

$$SCM_B = \frac{(M_B - 1) \times SCM_B + CM_k}{M_B}$$

wherein $N_I$, $N_P$, $N_B$ are the same or different numbers, $CK_k$ is the encoding complexity of picture with time index k and $SCM_I$, $SCM_P$, $SCM_B$ are the accumulated statistics of the encoding complexities of pictures of types I, P, B respectively.

3. A method comprising:
a method for encoding of ordered coding units comprising the steps of:
modeling the encoding complexity of previously encoded coding units based on the data generated after encoding said units;
accumulating statistics of the encoding complexities of all previously encoded coding units;
estimating the encoding complexity of the next coding unit to be encoded;
assigning a number of bits to the next coding unit to be encoded based on a function of the accumulated statistics, the estimated encoding complexity, the number of coding units per unit time interval and the desired average rate per unit time interval;
the data is video data;
the coding units are pictures;
the method for encoding applied to MPEG video coding wherein an instantaneous coding rate of $R_I$ is found as a function of the desired average coding rate per unit time interval $R_{UT}$, the number of pictures of each type $N_{IUT}$, $N_{PUT}$, $N_{BUT}$ to be encoded in a unit time interval, the estimated encoding complexities $C_I$, $C_P$, $C_B$ of each type of picture and the accumulated statistics of the encoding complexities $SCM_I$, $SCM_P$, $SCM_B$ of previously encoded pictures of each type; and allocating target number of bits $T_k$ to a picture to be encoded as a function of the instantaneous coding rate, the accumulated mismatch between target number of bits allocated and actual number of bits produced for all previously encoded pictures $EB_{k-1}$, the estimated encoding complexity $C_k$ of the picture to be encoded, the parameters $N_{IUT}$, $N_{PUT}$, $N_{BUT}$, $C_I$, $C_P$, $C_B$, and the upper and lower bounds on the bits that can be produced for the picture to be encoded before underflowing $U_k$ or overflowing $L_k$ the virtual buffer verifier wherein k is the time index.

4. The method of claim 3 wherein the said functions are $$R_I = \frac{N_{IUT} \times C_I + N_{PUT} \times C_P + N_{BUT} \times C_B}{N_{IUT} \times SCM_I + N_{PUT} \times SCM_P + N_{BUT} \times SCM_B} \times R_{UT}$$

$$T_k = \frac{R_I + EB_{k-1}}{N_{IUT} \times C_I + N_{PUT} \times C_P + N_{BUT} \times C_B} \times C_k$$

If $T_k \geq U_k$ then $T_k = U_k$

If $T_k \leq L_k$ then $T_k = L_k$.

5. A method comprising:
a method for encoding of ordered coding units comprising the steps of:
  modeling the encoding complexity of previously encoded coding units based on the data generated after encoding said units;
  accumulating statistics of the encoding complexities of all previously encoded coding units;
  estimating the encoding complexity of the next coding unit to be encoded;
  assigning a number of bits to the next coding unit to be encoded based on a function of the accumulated statistics, the estimated encoding complexity the number of coding units per unit time interval and the desired average rate per unit time interval;
  the data is video data;
  the coding units are pictures;
the method for encoding applied to MPEG video coding wherein an intermediate target number of bits $T_{inter}$ is computed as a function of the desired average coding rate per unit time interval $R_{UT}$, the number of pictures of each type $N_{IUT}$, $N_{PUT}$, $N_{BUT}$ to be encoded in a unit time interval, the estimated encoding complexities $C_I$, $C_P$, $C_B$ of each type of picture and the accumulated mismatch between target number of bits allocated and actual number of bits produced for all previously encoded pictures $EB_{k-1}$; and allocating target number of bits $T_k$ to a picture to be encoded as a function of the intermediate target number of bits, the estimated encoding complexity $C_k$ of the picture to be encoded and the accumulated statistics of the encoding complexities $SCM_I$, $SCM_P$, $SCM_B$ of previously encoded pictures of each type; and the upper and lower bounds on the bits that can be produced for the picture to be encoded before underflowing $U_k$ or overflowing $L_k$ the virtual buffer verifier wherein k is the time index.

6. A method of claim 5 wherein said functions for allocating a number of bits ($T_k$) to the picture to be coded comprises the equations:

$$T_{inter} = \frac{R_{UT} + EB_{k-1}}{N_{IUT} \times C_I + N_{PUT} \times C_P + N_{BUT} \times C_B} \times C_k$$

$$T_k = T_{inter} + \frac{C_k - SCM_k}{C_k + SCM_k} \times (U_k - T_{inter}) \times \alpha$$

If $T_k \geq U_k$ then $T_k = U_k$

If $T_k \leq L_k$ then $T_k = L_k$ where in $\alpha$ is a number greater than zero.

* * * * *